US 8,633,796 B2

(12) United States Patent
Tobita et al.

(10) Patent No.: US 8,633,796 B2
(45) Date of Patent: Jan. 21, 2014

(54) INFORMATION PROCESSING SYSTEM, CONTROL INFORMATION PROCESSING DEVICE, AND PROGRAM

(75) Inventors: Naoto Tobita, Tokyo (JP); Shigeki Wakasa, Kanagawa (JP); Makoto Daicho, Tokyo (JP); Hiroaki Yamada, Tokyo (JP)

(73) Assignee: FeliCa Networks, Inc., Tokyo (JP)

( * ) Notice: Subject to any disclaimer, the term of this patent is extended or adjusted under 35 U.S.C. 154(b) by 1347 days.

(21) Appl. No.: 12/100,980

(22) Filed: Apr. 10, 2008

(65) Prior Publication Data
US 2008/0284560 A1 Nov. 20, 2008

(30) Foreign Application Priority Data

Apr. 13, 2007 (JP) ................... 2007-106588

(51) Int. Cl.
*G06F 3/00* (2006.01)
*H04B 5/00* (2006.01)

(52) U.S. Cl.
USPC ........... 340/5.1; 340/7.33; 340/7.4; 340/10.1; 455/42

(58) Field of Classification Search
CPC ............ G05B 19/00; H04L 9/00; H04B 5/00; G06F 17/60; H04Q 7/20
USPC ........... 340/5.1, 7.33, 7.4, 10.1, 10.5; 455/41, 455/42, 513, 445, 556.1; 710/10, 1; 705/14
See application file for complete search history.

(56) References Cited

U.S. PATENT DOCUMENTS

| 5,420,606 A | * | 5/1995 | Begum et al. | ................. 345/156 |
| 5,754,654 A | * | 5/1998 | Hiroya et al. | ................... 705/76 |
| 6,556,843 B1 | * | 4/2003 | Okumura | ...................... 455/558 |
| 6,869,013 B2 | * | 3/2005 | Allen et al. | ................... 235/381 |

(Continued)

FOREIGN PATENT DOCUMENTS

| EP | 0 713 198 | 11/1996 |
| JP | 2001/076058 A | 3/2001 |

(Continued)

OTHER PUBLICATIONS

Svend Frolund and Rachid Guerraoui, "e-Transactions: End-to End Reliability for Three-Tier Architectures." IEEE Transactions on Software Engineering, vol. 28, No. 4, (Apr. 2002.) pp. 378-395.

(Continued)

*Primary Examiner* — Nam V Nguyen
(74) *Attorney, Agent, or Firm* — Finnegan Henderson Farabow Garrett & Dunner LLP

(57) ABSTRACT

There is provided an information processing system that includes an information processing terminal equipped with an IC chip capable of non-contact communication with a reader/writer, a data provider device that stores a first data record for creating service data, and a control information processing device that creates the service data and transmits the service data to the information processing terminal. The information processing terminal includes a terminal communication portion that acquires the first data record from the data provider device and transmits the first data record to the control information processing device. The control information processing device includes a control communication portion that receives the first data record, a control storage portion that stores a second data record for creating the service data, and a data creation portion that creates the service data based on the first data record and the second data record.

7 Claims, 10 Drawing Sheets

(56) References Cited

U.S. PATENT DOCUMENTS

| | | | |
|---|---|---|---|
| 7,016,681 B2* | 3/2006 | Hata et al. | 455/445 |
| 7,308,254 B1* | 12/2007 | Rissanen | 455/414.1 |
| 7,512,401 B2* | 3/2009 | Muhonen et al. | 455/414.1 |
| 7,734,650 B2* | 6/2010 | Naito et al. | 707/791 |
| 7,890,606 B2* | 2/2011 | Morita et al. | 709/219 |
| 8,385,899 B2* | 2/2013 | Kuhl et al. | 455/418 |
| 2002/0177407 A1* | 11/2002 | Mitsumoto | 455/41 |

FOREIGN PATENT DOCUMENTS

| | | |
|---|---|---|
| JP | 2002-117313 | 4/2002 |
| JP | 2002/279274 A | 9/2002 |
| JP | 2002-288502 | 10/2002 |
| JP | 3614480 | 11/2004 |
| JP | 2005-11211 | 1/2005 |
| JP | 2005/025662 A | 1/2005 |
| JP | 2005/222520 A | 8/2005 |
| JP | 2005/326949 A | 11/2005 |
| JP | 2006-101289 | 4/2006 |
| JP | 2006-120062 | 5/2006 |
| JP | 2008/262513 A | 10/2008 |

OTHER PUBLICATIONS

Liu, Jiang B., "Multi-tiered Internet Computing using Java Technologies", IECON'01: The 27th Annual Conference of the IEEE Industrial Electronics Society, vol. 3, (Nov. 2001) pp. 1789-1793.

Dianlong Zhang and Werner Zorn: "End-to-End Transactions in Three-Tier Systems", Distributed objects and Applications, 2001. DOA'01. Proceedings. 3rd International Symposium (Sep. 2001) pp. 330-339.

Dabo Sun et al: "Lessons Learned in Web site Architectures for Public Utilities", Proceedings of the fifth IEEE International Workshop on Web Site Evolution (WSE'3) ( Sep. 2003) pp. 93-100.

European Search Report of Corresponding European Application No. EP 08 25 1314 mailed Mar. 3, 2011.

Office Action document issued by the Japanese Patent Office in corresponding Japanese Application No. 2007-106588 on May 22, 2012, 6 pages.

Japanese Patent Office, Office Action (Rejection Notice), Sep. 3, 2013.

* cited by examiner

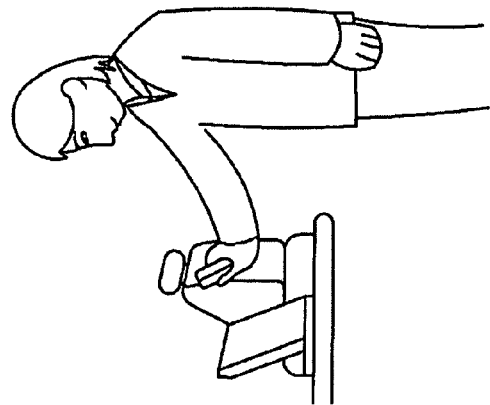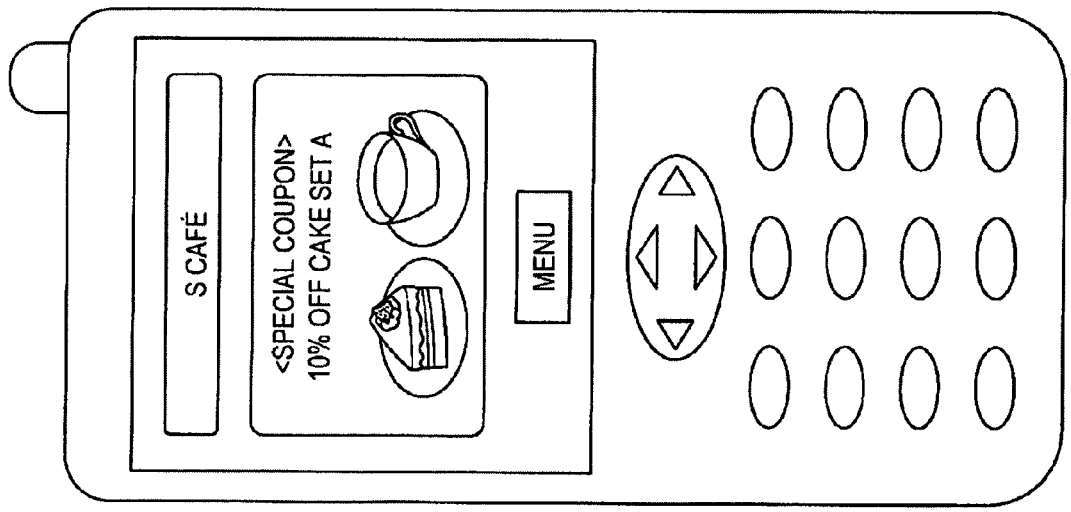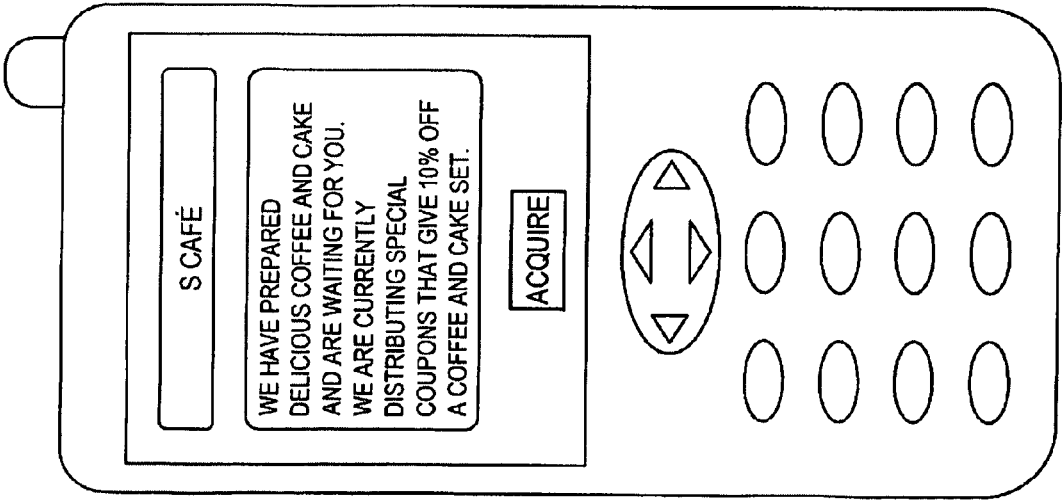

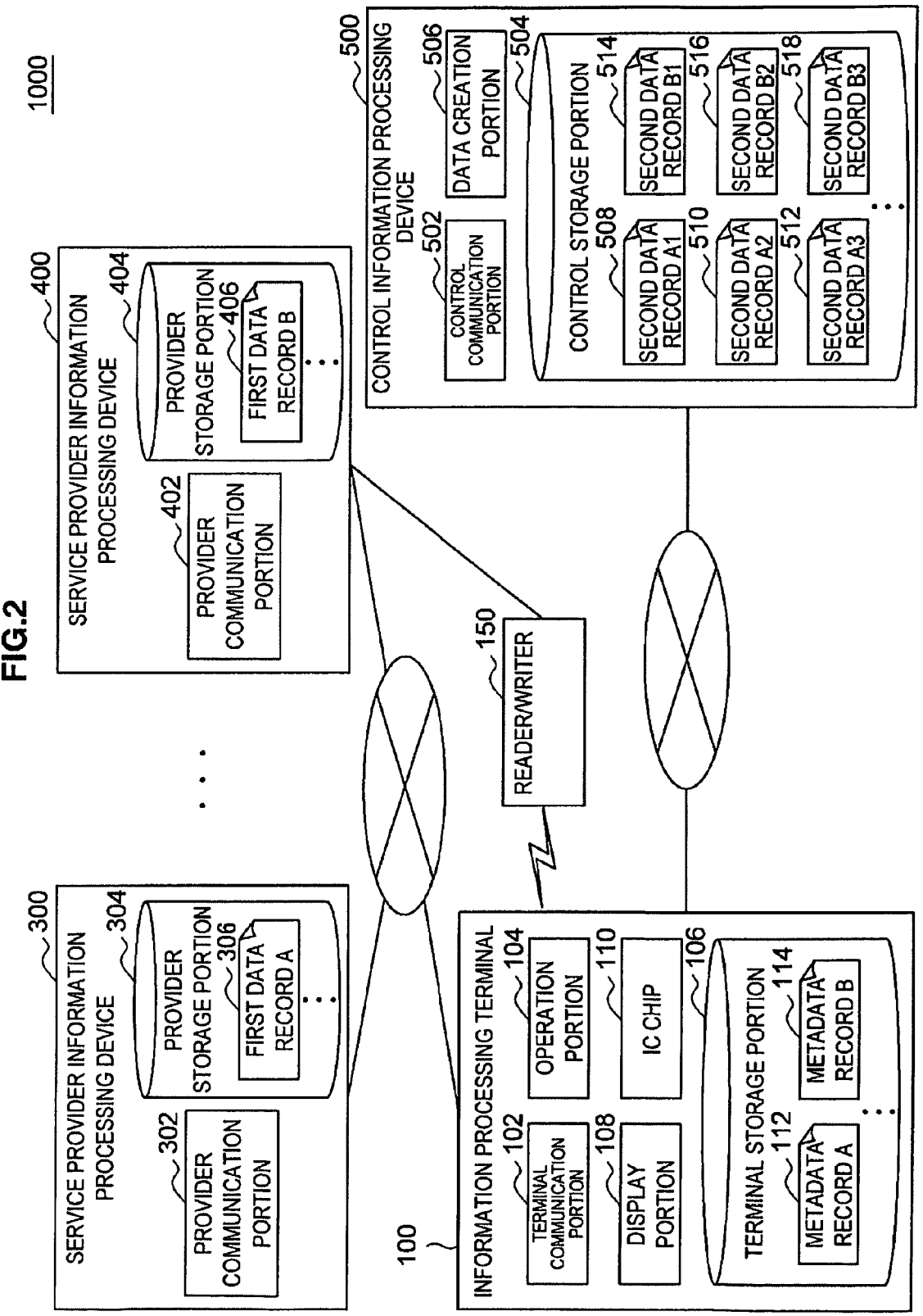

FIG.4

```
<?wat version="1.0"?>
<SP>
<ID>000001</ID>
<COMPANY NAME>S CAFÉ</COMPANY NAME>
<SERVICE NAME>COUPON SERVICE</SERVICE NAME>
<EXPLANATION>WE PROVIDE SPECIAL COUPONS.</EXPLANATION>
<F ENCODE>
<data>
<f>303E400A</f>
<lim>1</lim>
</data>
<Viewer>
<data><size>6</size>
<encode>JAPANESE</encode>
<caption><SPECIAL COUPON></caption>
</data>
<data><size>6</size>
<encode>JAPANESE</encode>
<caption>10% OFF CAKE SET A</caption>
</data>
<data>
<img src="image/cake_set_a.gif">
</data>
</Viewer>
</F ENCODE>
</SP>
```

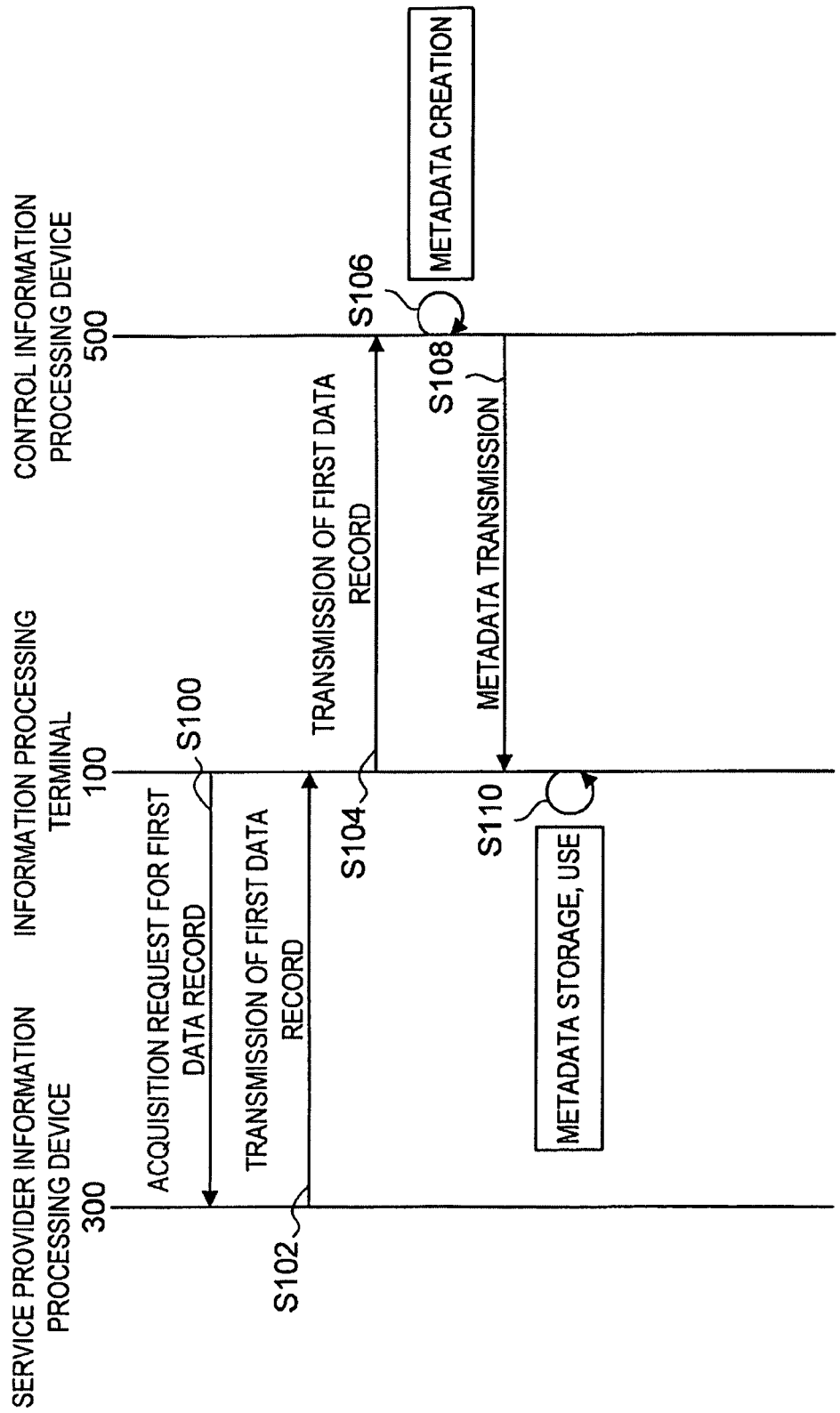

FIG.7

```
<object declare id="application.name" data="BBB">
<program name="tgmc" value="pM1FGkq">
</object>
```
~318

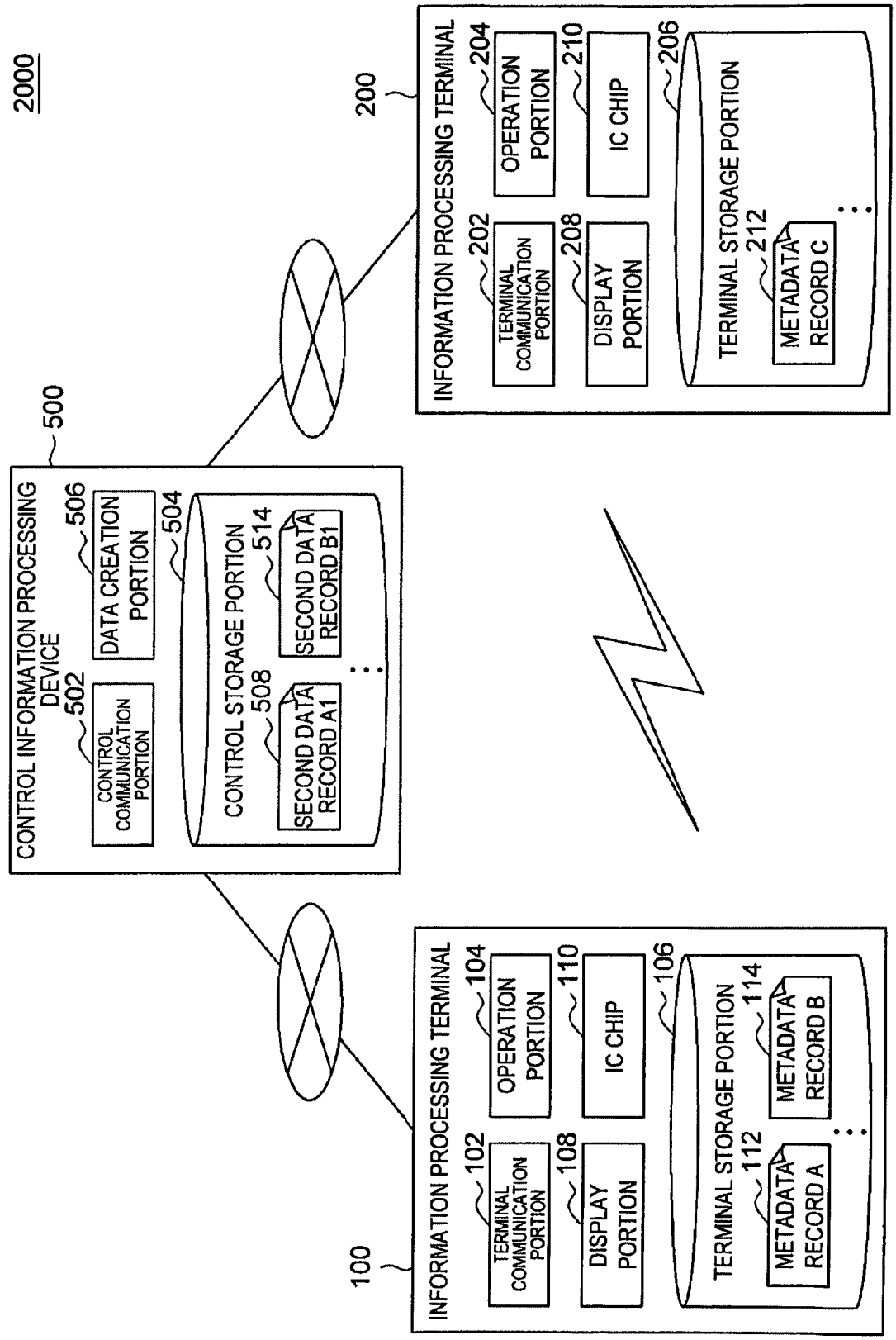

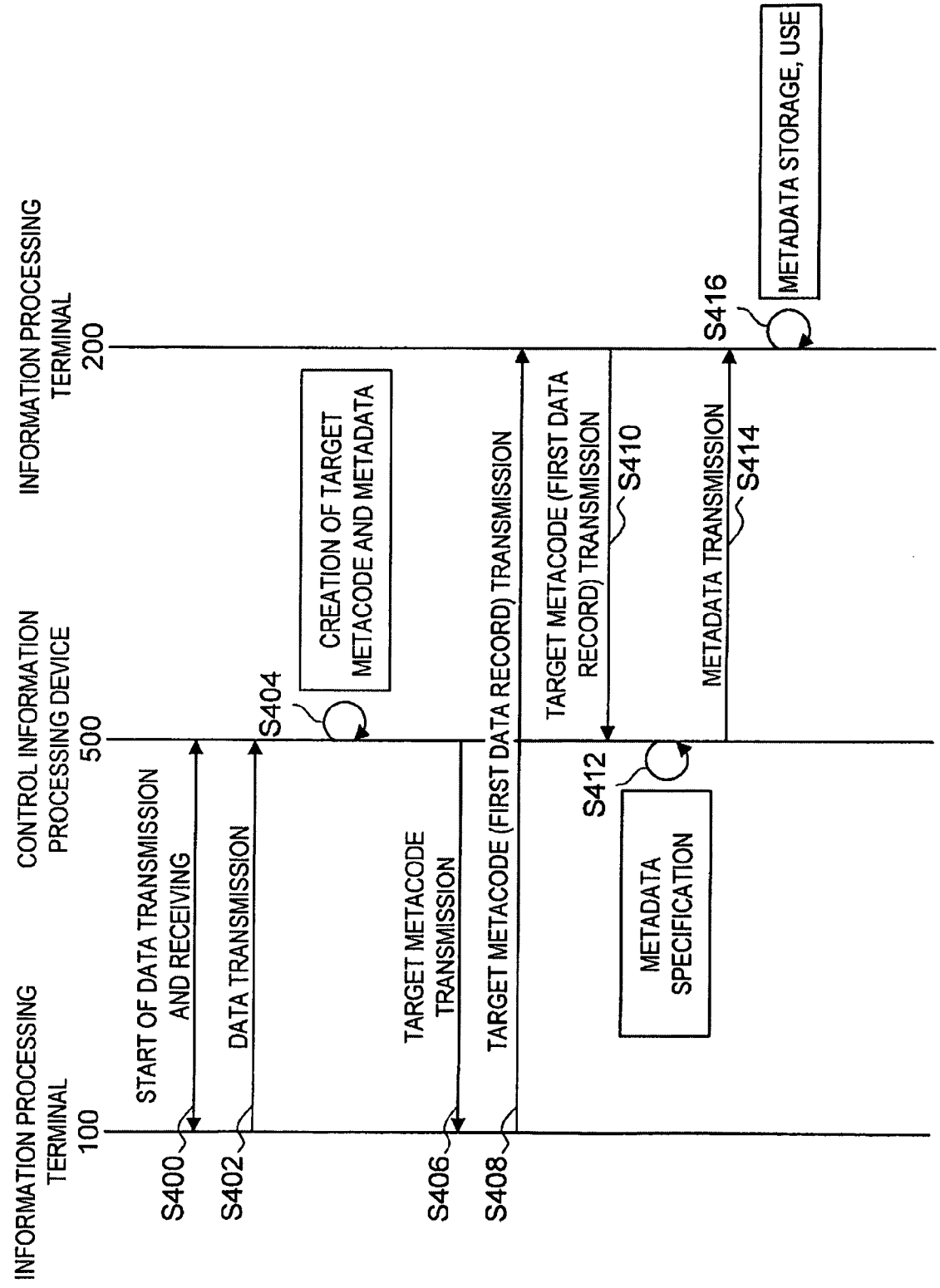

INFORMATION PROCESSING SYSTEM, CONTROL INFORMATION PROCESSING DEVICE, AND PROGRAM

CROSS REFERENCES TO RELATED APPLICATIONS

The present invention contains subject matter related to Japanese Patent Application JP 2007-106588 filed in the Japan Patent Office on Apr. 13, 2007, the entire contents of which being incorporated herein by reference.

BACKGROUND OF THE INVENTION

1. Field of the Invention

The present invention relates to an information processing system, a control information processing device, and a program.

2. Description of the Related Art

In recent years, information processing terminals have come in to widespread use that are capable of non-contact communication with a read/write unit (reader/writer), such as a mobile telephone or the like that is provided with a non-contact type integrated circuit (IC) card (hereinafter called by its generally used name "smart card") or a non-contact type IC chip.

Being provided with an IC chip that is tamper-proof makes the information processing terminal that is capable of non-contact communication with the reader/writer able to transmit, receive, and update securely data such as electronic money, tickets, and the like for which data falsification is a problem, data such as credit card numbers and the like for which unauthorized disclosure is a problem, and data on personal information such as member numbers and the like. Therefore, the providing of services that utilize the information processing terminal that is capable of non-contact communication with the reader/writer is spreading throughout society.

It is in this context that various technologies have been developed that utilize the information processing terminal that is provided with the IC chip and is capable of non-contact communication with the reader/writer. A technology is disclosed in Japanese Patent Application Publication No. JP-A-2006-120062, for example, that is capable of receiving an information provision service, even with an IC chip other than an IC chip that is distributed by the provider of the information. Further, a technology that uses information that is acquired from the information processing terminal to issue a ticket is disclosed in Japanese Patent Application Publication No. JP-A-2005-11211, for example. Moreover, a technology that stores information such as a transaction history, electronic money, and the like in the information processing terminal and sells and redeems an electronic ticket is disclosed in Japanese Patent Publication No. 3614480, for example.

SUMMARY OF THE INVENTION

However, with the known technologies that utilize the information processing terminal that is provided with the IC chip, every time a new service is made available, a burden is placed on the party who provides the service (hereinafter called the "service provider"). The burden may be that an information processing system must be constructed for use in providing the service, or in a case where data that is used by the IC chip is modified, that a program in a control information processing device on the data provision side of the system must be modified, for example.

The present invention addresses the problems described above and provides an information processing system, a control information processing device, and a program that are new and improved and that are capable of creating, from a first data record that is transmitted from the information processing terminal that is provided with the IC chip and from a second data record that is stored in a control information processing device, data that can be used by the information processing terminal.

According to an embodiment of the present invention, there is provided an information processing system that includes an information processing terminal, a data provider device, and a control information processing device. The information processing terminal is equipped with an IC chip that is capable of non-contact communication with a reader/writer. The data provider device stores a first data record that is used to create service data that include data used by the IC chip. The control information processing device creates the service data and transmits the service data to the information processing terminal. The information processing terminal includes a terminal communication portion that acquires the first data record from the data provider device and transmits the first data record to the control information processing device. The control information processing device includes a control communication portion, a control storage portion, and a data creation portion. The control communication portion receives the first data record that is transmitted from the information processing terminal. The control storage portion stores at least one second data record that is used to create the service data. The data creation portion creates the service data based on the first data record and at least one second data record that corresponds to the first data record.

The information processing system can include the data provider device, the information processing terminal equipped with the IC chip that is capable of non-contact communication with a reader/writer, and the control information processing device. The data provider device that is a configuring element of the information processing system can be, for example, a service provider device that provides a service to a user of the information processing terminal, and it can store the first data record that is used to create the service data that can be used by the information processing terminal and that include data used by the IC chip.

The information processing terminal that is a configuring element of the information processing system can include at least the terminal communication portion. Because the information processing terminal includes the terminal communication portion, the information processing terminal can acquire the first data record from the data provider device, through a network such as the Internet or the like, for example, or through a reader/writer, and can also transmit the acquired first data record to the control information processing device.

The control information processing device that is a configuring element of the information processing system can include the control communication portion, the control storage portion, and the data creation portion. The control communication portion is a portion for performing communication with an external device, and it can perform communication with the information processing terminal through a network, for example, and can acquire the first data record from the information processing terminal. The control storage portion is a storage portion that is included in the control information processing device, and it can store the at least one second data record that is used to create the service data that can be used by the information processing terminal and that include data used by the IC chip. The data creation portion can create the service data based on the first data record and at least one second data record that corresponds to the first data record, and it can transmit the created service data to the information processing terminal.

This configuration brings in to being an information processing system that is capable of creating data that can be used by the information processing terminal, based on the first data record that is transmitted from the information processing terminal equipped with the IC chip and on the second data record that is stored in the control information processing device.

According to the embodiments of the present invention described above, there is provided a control information processing device that creates service data that include data used by an IC chip that is capable of non-contact communication with a reader/writer, and that transmits the service data to an information processing terminal that is equipped with the IC chip. The control information processing device includes a control communication portion, a control storage portion, and a data creation portion. The control communication portion receives a first data record that is transmitted from the information processing terminal and that is used to create the service data. The control storage portion stores at least one second data record that is used to create the service data. The data creation portion creates the service data based on the first data record and at least one second data record that corresponds to the first data record.

The control information processing device can include the control communication portion, the control storage portion, and the data creation portion. The control communication portion can perform communication with the information processing terminal through a network, for example, and can acquire the first data record from the information processing terminal. The control storage portion can store the at least one second data record that is used to create the service data that can be used by the information processing terminal and that include data used by the IC chip. The data creation portion can create the service data based on the first data record and at least one second data record that corresponds to the first data record, and it can transmit the created service data to the information processing terminal. This configuration makes it possible to create data that can be used by the information processing terminal, based on the first data record that is transmitted from the information processing terminal equipped with the IC chip and on the second data record that is stored in the control information processing device.

The first data record that is transmitted from the information processing terminal may also be dynamic data that is stored, and can be modified, in a data provider device that is a device that is external to the information processing terminal. The second data record may also be static data that is stored in advance in the control storage portion.

This configuration makes it possible to create the service data in a more flexible manner.

The first data record may also be expressed in the form of a markup language. The data creation portion may also interpret the first data record that is expressed in the form of a markup language and may select from the at least one second data record that is stored in the control storage portion at least one second data record that corresponds to the first data record.

This configuration makes it possible to create data that can be used by the information processing terminal, based on the first data record that is transmitted from the information processing terminal equipped with the IC chip and on the second data record that is stored in the control information processing device, even in a case where the first data record is modified in the data provider device that is a device that is external to the information processing terminal.

The service data that the data creation portion creates may also be a metadata record that is expressed in the form of a markup language.

This configuration makes it possible to make the service data that is utilized in the information processing terminal in to data that has little dependence on the information processing terminal.

In a case where the data creation portion has also created and transmitted to the information processing terminal surrogate data that is used to specify the created service data, and has acquired the surrogate data from the information processing terminal, the data creation portion may also transmit to the information processing terminal the service data that corresponds to the surrogate data.

This configuration makes it possible to convey the created service data to the information processing terminal more reliably and more safely.

According to the embodiments of the present invention described above, there is provided a program for a control information processing device that stores at least one second data record that is used to create service data that include data used by an IC chip that is capable of non-contact communication with a reader/writer. The program causes a computer to function as a portion that receives a first data record that is transmitted from an information processing terminal equipped with the IC chip and that is used to create the service data. The program causes the computer to function as a portion that creates the service data based on the first data record and at least one second data record that corresponds to the first data record.

This program makes it possible to create data that can be used by the information processing terminal, based on the first data record that is transmitted from the information processing terminal equipped with the IC chip and on the second data record that is stored in the control information processing device.

According to the embodiments of the present invention described above, data that can be used by the information processing terminal can be created based on the first data record that is transmitted from the information processing terminal equipped with the IC chip and on the second data record that is stored in the control information processing device.

BRIEF DESCRIPTION OF THE DRAWINGS

FIG. 1 is an explanatory figure for explaining problems in a known information processing system;

FIG. 2 is a block diagram that shows an information processing system according to a first embodiment of the present invention;

FIG. 4 is an explanatory figure that shows an example of a metadata record according to the embodiments of the present invention;

FIG. 5 is an explanatory figure for explaining a first data creation method according to the first embodiment of the present invention;

FIG. 7 is an explanatory figure that shows an example of a target metacode according to the embodiments of the present invention;

FIG. 9 is a block diagram that shows an information processing system according to a second embodiment of the present invention; and FIG. 10 is an explanatory figure for explaining a data transfer method according to the second embodiment of the present invention.

DETAILED DESCRIPTION OF THE PREFERRED EMBODIMENTS

Figure 3B:
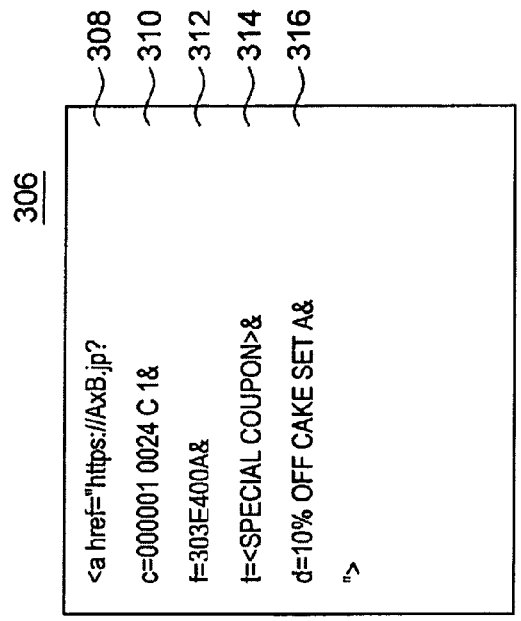
FIG. 3 is an explanatory figure that shows an example of a first data record according to embodiments of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Problems in a Known Information Processing System

First, before an information processing system according to embodiments of the present invention is explained, an example of a problem in a known information processing system will be explained.

FIG. 1 is an explanatory figure for explaining an example of a problem in the known information processing system. It shows an example of acquisition and use of a coupon by a mobile telephone that is provided with an IC chip.

As shown in FIG. 1A, a user who uses the mobile telephone can access a Web site for use by mobile telephones, a Web site for use by personal computers, or the like and obtain through the Web site coupon information (service data) like that shown in FIG. 1B.

Coupon data that can be used by the IC chip may also be included in the coupon information (the service data) that the user obtains. The user who obtains the coupon data can make use of the obtained coupon data and coupon information by holding the mobile telephone up to a reader/writer, (that is, by performing communication between the reader/writer and the IC chip and transmitting the coupon data), as shown in FIG. 1C, for example, or by showing the obtained coupon information to a service provider (a store clerk or the like, for example).

As a way to attract customers, the service provider who provides the coupon information that the user can use, as shown in FIGS. 1A to 1C, for example, may change the content of the coupon information as necessary (for example, 10% off cake set A, as shown in FIG. 1B). However, in the known information processing system, changing the content of the coupon information requires, for example, a program change or the like in a control information processing device (service center) on the data provision side that provides the coupon data and the coupon information to the mobile telephone. Therefore, the service provider cannot easily change the content of the coupon data and the coupon information.

First Embodiment

Next, the information processing system according to the embodiments of the present invention will be explained. FIG. 2 is a block diagram that shows an information processing system 1000 according to a first embodiment of the present invention.

Referring to FIG. 2, the information processing system 1000 according to the first embodiment of the present invention includes an information processing terminal 100, service provider information processing devices 300, 400, and the like, and a control information processing device 500.

The information processing terminal 100 and the service provider information processing devices 300, 400, and the like, as well as the information processing terminal 100 and the control information processing device 500, may be connected by network circuits, for example. The network circuits may be wired networks such as local area networks (LANs), wide area networks (WANs), or the like, or wireless networks such as wireless local area networks (WLANs) or the like that use multiple-input and multiple-output (MIMO). The network circuits may also be the Internet and utilize a communications protocol such as the Transmission Control Protocol/Internet Protocol (TCP/IP), and may also be networks that are connected via a base station or the like (not shown in the drawings) that fulfills the role of a wireless LAN access point, but the network circuits are not limited to these examples.

The information processing terminal 100 and the service provider information processing devices 300, 400, and the like may also be connected through a reader/writer 150. The information processing terminal 100 and the reader/writer 150 can perform non-contact communication by using a magnetic field (a carrier wave) of a specific frequency, such as 13.56 MHz or the like, for example.

The information processing terminal 100 and the service provider information processing devices 300, 400, and the like are not limited to performing communication by being connected through a network circuit or by being connected through the reader/writer 150. The information processing terminal 100 and the service provider information processing devices 300, 400, and the like can also perform communication by using short range wireless communication that utilizes infrared light, IEEE 802.11 (called "Wi-Fi"), IEEE 802.15.1, or the like, for example.

Being connected by the network circuits or by the reader/writer 150 makes it possible for the information processing terminal 100 and the service provider information processing devices 300, 400, and the like to transfer data directly, but the information processing terminal 100 and the service provider information processing devices 300, 400, and the like are not limited to transferring data directly. For example, if a user who uses the information processing terminal 100 has a personal computer that is connected to the service provider information processing devices 300, 400, and the like, the user can transmit data from the personal computer to the information processing terminal 100 by electronic mail, thus making it possible for the information processing terminal 100 and the service provider information processing devices 300, 400, and the like to transfer data indirectly.

Information Processing Terminal

The information processing terminal 100 is a device that the user can use, and it is provided with a terminal communication portion 102, an operation portion 104, a terminal storage portion 106, a display portion 108, and an IC chip 110. The information processing terminal 100 may also be provided with a terminal control portion (not shown in the drawings) that is configured from a micro processing unit (MPU) and that controls the entire information processing terminal 100.

The terminal communication portion 102 is a portion for performing communication with external devices, and it can perform communication with external devices such as the service provider information processing devices 300, 400, and the like through the network circuit and the reader/writer 150. Through a network such as the Internet or the like, or through the reader/writer 150, the terminal communication portion 102 can acquire a first data record (described later) from the service provider information processing devices 300, 400, and the like and can transmit the acquired first data record to the control information processing device 500. The transmission of the acquired first data record to the control information processing device 500 can be carried out by having the terminal control portion (not shown in the drawings) interpret the acquired first data record and specify a transmission destination.

The terminal communication portion 102 can also acquire from the control information processing device 500 data (hereinafter called the "service data") that include data that is used by the IC chip 110 and that can be used by the information processing terminal 100. The service data according to the embodiments of the present invention may include, for example, data that pertain to electronic money (for example, an electronic money value and related data items), data that pertain to personal verification (for example, a biometric data item and related data items), data that pertain to a ticket (for example, a ticket data item and related data items), data that pertain to coupon data (for example, a coupon data item and related data items), and the like, but the service data are not limited to these examples.

The operation portion 104 is an interface that the user can operate, such as a button, a direction key, a rotary type selector such as a jog dial or the like, a combination of these, or the like, for example.

The terminal storage portion 106 is a storage portion of the information processing terminal 100 that is provided outside the IC chip 110. The service data that are transmitted from the control information processing device 500 can be stored in the terminal storage portion 106. FIG. 2 shows that metadata records are stored as the service data in the terminal storage portion 106. The metadata records according to the embodiments of the present invention are data in which information that pertains to data that is used by the IC chip 110 is expressed in the form of a markup language. Note that the metadata records according to the embodiments of the present invention are not limited to data that are expressed in the form of a markup language, and it is obvious that the metadata records can be expressed in the form of data that are in a form that can be executed by the information processing terminal 100. Specific examples of the metadata records will be described later.

The terminal storage portion 106 may be, for example, a magnetic storage medium such as a hard disk or the like, a non-volatile memory such as a flash memory, a magnetoresistive random access memory (MRAM), a ferroelectric random access memory (FeRAM), a phase change random access memory (PRAM), or the like, a magneto optical disk, or the like, but the terminal storage portion 106 is not limited to these examples.

The display portion 108 is a display portion that is provided in the information processing terminal 100, and it can display a screen that pertains to an operation by the user, as well as content such as acquired coupon data, coupon information, and the like. The display portion 108 may be a liquid crystal display (LCD), an organic light emitting diode display (OLED; also called an organic electroluminescence display (organic EL display)), a field emission display (FED), or the like, but the display portion 108 is not limited to these examples.

The IC chip 110 incorporates in an integrated circuit various portions that are involved in communication with the reader/writer 150, and it can be tamper-proof. The IC chip 110 can also include within itself a storage portion (not shown in the drawings) that stores data that are used by the IC chip 110 and that are included in the metadata records that are transmitted from the control information processing device 500. The reader/writer 150, by using the carrier wave to perform communication with the IC chip 110, reads and writes the data that are stored in the storage portion (not shown in the drawings) within the IC chip 110 and that are used by the IC chip 110.

Service Provider Information Processing Device (Data Provider Device)

The service provider information processing device 300 may be, for example, a service provider device that controls a Web site for use by mobile telephones or a Web site for use by personal computers. The service provider information processing device 300 may also be a device that is installed in a location such as a shop or the like that provides a service. The service provider information processing device 300 can be provided with a provider communication portion 302 and a provider storage portion 304. The service provider information processing device 300 may also be provided with a provider control portion (not shown in the drawings) that is configured from an MPU or the like and that controls the entire service provider information processing device 300. The service provider information processing device 300 may also be provided with a provider operation portion (not shown in the drawings) or the like that a manager can operate. The service provider information processing device 400 and the like are configured in the same manner as the service provider information processing device 300, so the explanation below will be about the service provider information processing device 300.

The provider communication portion 302 is a portion that performs communication with external devices, and it can perform communication with external devices such as the ip[tm 100 and the like through the network circuit or the reader/writer 150.

The provider storage portion 304 is a storage portion that is provided in the service provider information processing device 300, and it can store the first data record that is used to create the service data. The provider storage portion 304 may be, for example, a magnetic storage medium such as a hard disk or the like, a non-volatile memory such as a flash memory or the like, a magneto optical disk, or the like, but the provider storage portion 304 is not limited to these examples.

The first data record according to the embodiments of the present invention is a data item that contains information for creating the service data. The first data record can be defined as a data item that is expressed in the form of a markup language, such as the Extensible Markup Language or the like, for example, in such a way that the data item is easy to create and modify.

Example of the First Data Record: Data that Pertains to a Coupon

An example will be given of the first data record according to the embodiments of the present invention. FIG. 3 is an explanatory figure that shows the example of the first data record according to the embodiments of the present invention. A coupon for 10% off the price of a cake set is shown in FIG. 3A as the example of the first data record. Note that the first embodiment of the present invention will be explained below using the providing of a coupon as an example, but the embodiments of the present invention are obviously not limited to the providing of a coupon. The embodiments of the present invention can be applied to a variety of services, such as the issuance of a ticket or the like, for example.

Figure 3A:
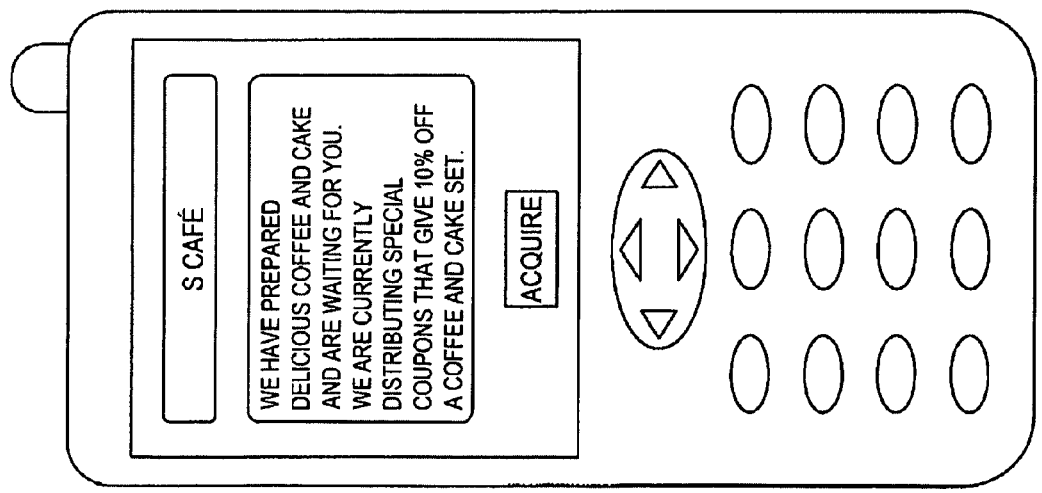

FIG. 3B is an explanatory figure that shows an example of a first data record A 306. Referring to FIG. 3B, the first data record A 306 is expressed in the form of a markup language and can include, for example, an address for the control information processing device 500 (reference numeral 308), information (reference numeral 310) that the control information processing device 500 uses to specify a corresponding second data record (described later), data (reference numeral 312) that are used within the IC chip 110, title information (reference numeral 314) for the service data, and explanatory information (reference numeral 316) for conveying the content of the service data to the user who uses the service data.

FIG. 3B shows an example of the information (reference numeral 310) that the control information processing device 500 uses to specify the corresponding second data record (described later). The example includes a service ID ("00001") that the control information processing device 500 uses to specify the service provider, an item ID ("0024") for specifying the service to be provided, a category ID ("C") for specifying a service category, and a redistribution restriction ("1") that prescribes a restriction on the redistribution of the service data that are created. By interpreting the first data record, the control information processing device 500 can specify the corresponding second data record (described later) and create the service data. The procedure by which the control information processing device 500 interprets the first data record may, for example, involve treating the ampersand (&) shown in FIG. 3B as a delimiter of a segment of the first data record and further dividing the segment in to units, each made up of a prescribed number of characters (such that each unit corresponds to an element of the information indicated by the reference numeral 310 in FIG. 3B, for example). However, the procedure by which the control information processing device 500 interprets the first data record is not limited to this example.

Further, in FIG. 3B, the data (reference numeral 312) that are used within the IC chip 110 are set as hexadecimal format data. The data (reference numeral 312) that are used within the IC chip 110 are data that can be read and interpreted by a reader/writer, as shown in FIG. 1C, for example. For that reason, the explanatory information (reference numeral 316) for conveying the content of the service data to the user who uses the service data is set separately, in a text format, in the first data record according to the embodiments of the present invention, shown in FIG. 3B.

Note that the information that is included in the first data record is not limited to the information described above and may also include, for example, use restriction information for allowing only a specific information processing terminal to use the information in the first data record, the date and time that the first data record was created, signature information that is used for verifying the authenticity of the first data record, and the like. It is also obvious that the format of the first data record according to the embodiments of the present invention and the information contained therein are not limited to the format and information shown in FIG. 3B.

Defining the first data record according to the embodiments of the present invention as data that are expressed in the form of a markup language makes it possible to embed the first data record according to the embodiments of the present invention in a Web site that is used to provide a service and that is created in the HyperText Markup Language, for example. Further, a markup language is a type of data description language that can standardize both a method of describing data and a method of accessing individual data elements and that can store data in a text format. Accordingly, expressing the first data record in the form of a markup language makes it possible for a service provider to easily modify the content of the first data record. Therefore, the first data record according to the embodiments of the present invention can be said to be dynamic data that can be modified by the service provider.

The Control Information Processing Device 500

The control information processing device 500 includes a control communication portion 502, a control storage portion 504, and a data creation portion 506. The control information processing device 500 may also be provided with a control portion (not shown in the drawings) that is configured from an MPU or the like and that controls the entire control information processing device 500.

The control communication portion 502 is a portion for performing communication with an external device and can perform communication with the information processing terminal 100 through the network circuit. The control communication portion 502 can acquire the first data record from the information processing terminal 100 and can transmit to the information processing terminal 100 the metadata record (described later) created by the data creation portion 506 that serves as the service data.

The control storage portion 504 is a storage portion that is provided in the control information processing device 500, and it can store at least one second data record that is used to create the service data. The second data record according to the embodiments of the present invention is a data record for creating the service data, and it can serve as a static data record that is set in advance by the service provider. The second data record may be, for example, display data (for example, XML format template data) that prescribes a layout for displaying the service data on the information processing terminal 100, or control data for the service data, such as storage rules and the like that control overwriting of the service data and prescribe a storage location in the information processing terminal 100. However, the second data record is obviously not limited to these examples. Note that even if the second data record according to the embodiments of the present invention is a static data record that is set in advance, the service provider can obviously perform addition, modification, deletion, and the like of the second data record.

Further, the control storage portion 504 may be, for example, a magnetic storage medium such as a hard disk or the like, a non-volatile memory such as a flash memory or the like, a magneto optical disk, or the like, but the control storage portion 504 is not limited to these examples.

The data creation portion 506 is configured from an MPU or the like and creates the metadata records that serve as the service data based on the first data record acquired from the information processing terminal 100 and at least one second data record that is stored in the control storage portion 504. The data creation portion 506 can interpret the first data record that is expressed in the form of a markup language, for example, and can select the corresponding second data record based on, for example, the service ID, the item ID, the category ID, and the like that are contained in the first data record. The data creation portion 506 can then create the metadata records by embedding information from the first data record in the second data record that was selected based on the results of the interpretation of the first data record.

Example of the Metadata Record: Data that Pertains to the Coupon Shown in FIG. 3

An example will be given of the metadata record according to the embodiments of the present invention. FIG. 4 is an explanatory figure that shows the example of the metadata record according to the embodiments of the present invention. The example shown is the metadata record that is created based on the first data record shown in FIG. 3.

FIG. 4 shows the metadata record that is created by selecting the second data record that will become the metadata record template, based on the service ID "000001", the item ID "0024", and the category ID "C" indicated by the reference numeral 310 in FIG. 3B, then embedding in the selected second data record the data "303E400A" that is used within the IC chip and is indicated by the reference numeral 312 in FIG. 3B, the redistribution restriction "1" indicated by the reference numeral 310 in FIG. 3B, the title information "<Special Coupon>" indicated by the reference numeral 314 in FIG. 3B, and the explanatory information "10% off Cake Set A" indicated by the reference numeral 316 in FIG. 3B.

The data creation portion 506 can create the metadata record shown in FIG. 4 by interpreting the first data record shown in FIG. 3B, which was acquired from the information processing terminal 100, so as to select the second data record from the control storage portion 504, then embedding information from the first data record in the second data record that was selected based on the results of the interpretation of the first data record. Making the service data a metadata record in a markup language format enables the data creation portion 506 to make the service data in to data that has little dependence on the information processing terminal 100. Note that the structure of the metadata record according to the embodiments of the present invention is not limited by FIG. 4, and it is obviously possible to define the data that are used within the IC chip 110 as data that are separate from the metadata record.

The metadata record is transmitted to the information processing terminal 100 through the control communication portion 502 as the service data created by the data creation portion 506. The information processing terminal 100 can store the metadata record created by the data creation portion 506 and can use within the IC chip 110 the data included in the metadata record that are used within the IC chip 110.

The configuration described above makes it possible for the information processing system 1000 according to the first embodiment of the present invention to create the service data that can be used by the information processing terminal 100 that is provided with the IC chip 110, based on the first data record that is transmitted from the information processing terminal 100 and on the at least one second data record that is stored in the control information processing device 500. Next, methods by which the metadata record (the service data) is created in the information processing system 1000 will be explained.

First Data Creation Method

FIG. 5 is an explanatory figure for explaining a first data creation method according to the first embodiment of the present invention. The first data creation method will be explained below using the service provider information processing device 300 as the service provider information processing device that stores the first data record, but the service provider information processing device in the first data creation method is obviously not limited to the service provider information processing device 300.

First, the information processing terminal 100 accesses the service provider information processing device 300 and sends an acquisition request for the first data record (step S100). The access to the service provider information processing device 300 may be accomplished by displaying a Web site for use by mobile telephones or a Web site for use by personal computers through a network such as the Internet or the like, or by performing communication with the service provider information processing device 300 through the reader/writer 150, for example.

The service provider information processing device 300, having received the acquisition request for the first data record from the information processing terminal 100, transmits the first data record to the information processing terminal 100 in response to the acquisition request (step S102). The first data record is data stored by the service provider information processing device 300, and it can be data expressed in the form of a markup language, like that shown in FIG. 3B, for example. Therefore, the first data record can be modified freely and easily by the service provider information processing device 300.

Having acquired the first data record that was transmitted from the service provider information processing device 300 at step S102, the information processing terminal 100 transmits the first data record to the control information processing device 500 (step S104).

The control information processing device 500, having acquired the first data record that was transmitted from the information processing terminal 100 at step S104, uses the acquired first data record and the stored second data record to create the metadata record that serves as the service data (step S106). Then the control information processing device 500 transmits to the information processing terminal 100 the metadata record that was created at step S106 (step S108).

Having acquired the metadata record that was transmitted from the control information processing device 500 at step S108, the information processing terminal 100 can store the acquired metadata record and use it as necessary (step S110).

In the first data creation method according to the first embodiment of the present invention, as described above, the information processing terminal 100 can acquire the first data record from the service provider information processing device 300 and transmit it to the control information processing device 500. The control information processing device 500 can use the acquired first data record and the second data record, which was stored in advance, to create the metadata record (the service data). The first data record can be, for example, data that is expressed in the form of a markup language that makes it easy to create and modify the data. Therefore, by using the first data creation method according to the first embodiment of the present invention, the service provider can freely and easily modify the first data record in the service provider information processing device 300. This means, for example, that in the information processing system 1000 according to the first embodiment of the present invention, unlike in the known information processing system, program modification and the like are not required, even in a case where the first data record is modified.

Further, in the first data creation method according to the first embodiment of the present invention, the control information processing device 500 can create the metadata record (the service data) that can be used by the information processing terminal 100, based on the acquired first data record and the second data record, which is stored in advance. In other words, in a case where the service provider starts a new service, the service provider, by creating the first data record and registering in the control information processing device 500 the second data record that corresponds to the first data record, can create the service data that can be used by the information processing terminal 100. Therefore, by using the first data creation method according to the first embodiment of the present invention, the service provider is freed from the need to build a new information processing system every time the service provider provides a new service, unlike with the known information processing system.

Note that in the event that a communication error occurs in the communication between the information processing terminal 100 and the service provider information processing device 300, or in the communication between the information processing terminal 100 and the control information processing device 500, a prescribed error processing, such as an error display or the like, can obviously be carried out in each device (the information processing terminal 100, the service provider information processing device 300, and the control information processing device 500), even though the error processing is not explicitly shown in FIG. 5.

Second Data Creation Method

The first data creation method shown in FIG. 5 was explained as a method in which the control information processing device 500 acquires the first data record that is transmitted from the information processing terminal 100, creates the metadata record, and transmits the created metadata record to the information processing terminal 100. However, the data creation method according to the embodiments of the present invention is not limited to the first data creation method. Accordingly, a second data creation method will be explained next in which additional communication is performed between the control information processing device 500 and the information processing terminal 100.

Figure 6:
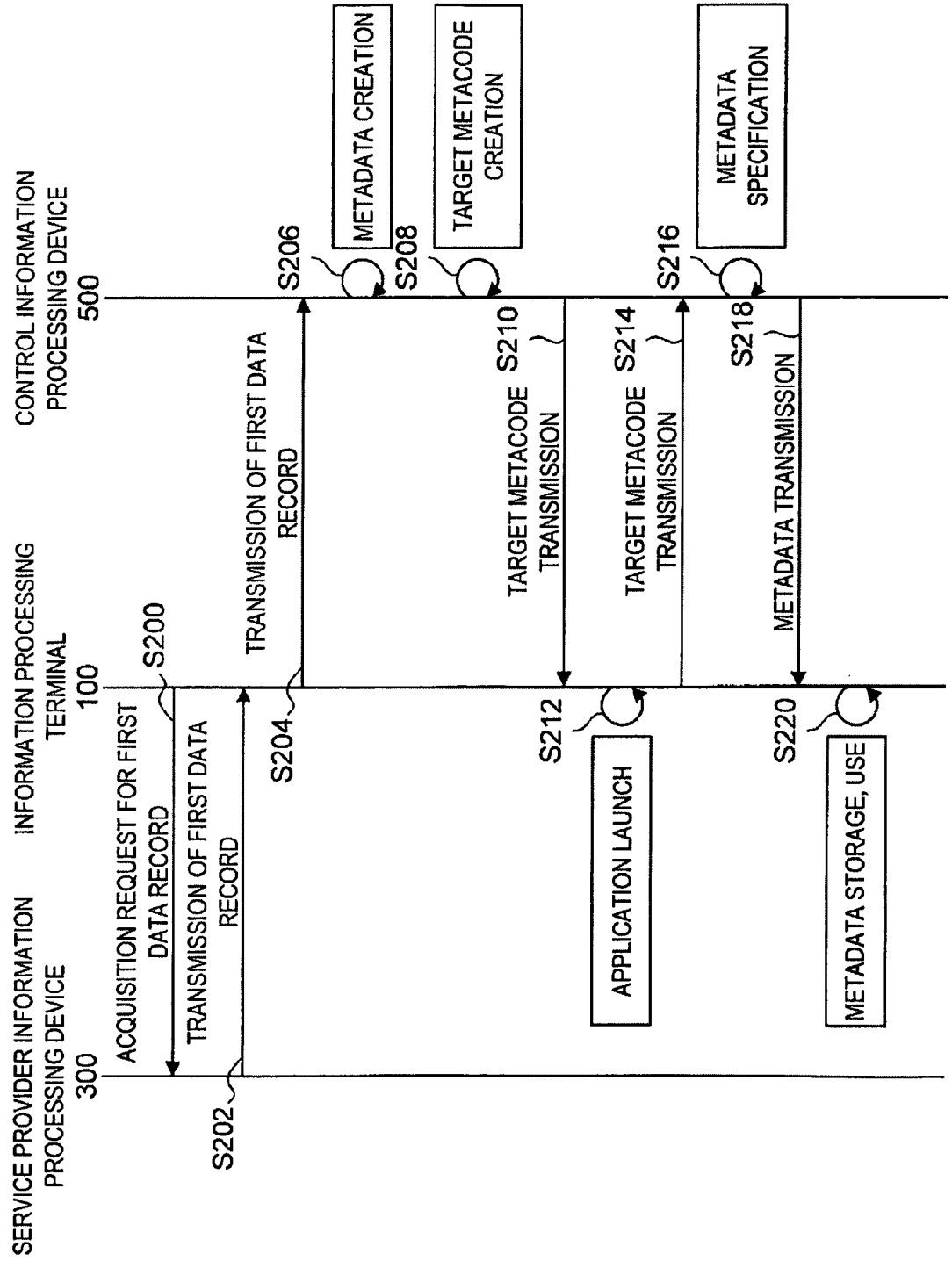
FIG. 6 is an explanatory figure for explaining a second data creation method according to the first embodiment of the present invention.

FIG. 6 is an explanatory figure for explaining the second data creation method according to the first embodiment of the present invention. The second data creation method will be explained below using the service provider information processing device 300 as the service provider information processing device that stores the first data record, but the service provider information processing device in the second data creation method is not limited to the service provider information processing device 300.

In the same manner as in the first data creation method, the information processing terminal 100 accesses the service provider information processing device 300 and sends an acquisition request for the first data record (step S200). Then the service provider information processing device 300, having received the acquisition request for the first data record from the information processing terminal 100, transmits the first data record to the information processing terminal 100 in response to the acquisition request (step S202).

Having acquired the first data record that was transmitted from the service provider information processing device 300 at step S202, the information processing terminal 100, in the same manner as in the first data creation method, transmits the first data record to the control information processing device 500 (step S204).

The control information processing device 500, having acquired the first data record that was transmitted from the information processing terminal 100 at step S204, uses the acquired first data record and the stored second data record to create the metadata record that serves as the service data (step S206).

The control information processing device 500 also creates a target metacode (step S208) and transmits the created target metacode to the information processing terminal 100 (step S210). The target metacode that the control information processing device creates at step S208 is data that specifies the metadata record that was created at step S206.

Example of the Target Metacode

An example of the target metacode according to the embodiments of the present invention will be explained. FIG. 7 is an explanatory figure that shows an example of the target metacode according to the embodiments of the present invention. In FIG. 7, the reference numeral 318 denotes the example of the target metacode, the value of which is set to "pM1FGkq". The value of the target metacode according to the embodiments of the present invention can be set to any character string that the data creation portion 506 of the control information processing device 500 creates based on the metadata record. The character string creation procedure according to the embodiments of the present invention, in which the character string is based on the metadata record, may be a procedure that computes a hash value based on the created metadata record that the data creation portion 506 created, for example, but it is not limited to this procedure. The value of the target metacode according to the embodiments of the present invention may also be set to a random numerical value that the data creation portion 506 generates by an arbitrary procedure, for example. In this case, the data creation portion 506 can store the random numerical value together with the created metadata record, for example, such that a one-to-one connection is made between the random numerical value and the metadata record.

The control information processing device 500 can also transmit to the information processing terminal 100, along with the created target metacode, data for launching a specified application in the information processing terminal 100. In FIG. 7, the id and the data that are set in the object tag correspond to the data for launching a specified application. Note that the target metacode according to the embodiments of the present invention is not limited to that shown in FIG. 7, but may also include information for displaying on the display portion 108 of the information processing terminal 100 a screen that conveys the progress of processing to the user of the information processing terminal 100, for example.

Referring once again to FIG. 6, the information processing terminal 100, having acquired the target metacode that was transmitted from the control information processing device 500 at step S210, launches the application that corresponds to the target metacode (step S212) and transmits the acquired target metacode to the control information processing device 500 (step S214). The transmission of the target metacode from the information processing terminal 100 to the control information processing device at step S214 can be done automatically by the application that was launched at step S212, for example. Note that the transmission of the target metacode at step S214 is not limited to this example, and the user of the information processing terminal 100 may perform the transmission by operating the operation portion 104, for example.

The control information processing device 500, having acquired the target metacode that was transmitted from the information processing terminal 100 at step S214, specifies the metadata record that corresponds to the acquired target metacode (that is, the metadata record that was created at step S206) (step S216). The control information processing device 500 then transmits to the information processing terminal 100 the metadata record that was specified at step S216 (step S218). As described above, the target metacode that was created at step S208 can be used at step S216 to specify the metadata record. In other words, the target metacode according to the embodiments of the present invention can be used as surrogate data that is transmitted to the information processing terminal 100 in place of the metadata record.

The sending back from the information processing terminal 100 of the target metacode that is transmitted to the information processing terminal 100 at step S210 makes it possible for the control information processing device 500 to recognize that the specified application that corresponds to the target metacode has been launched in the information processing terminal 100. The control information processing device 500 can thus transmit the metadata record using more secure communication with the information processing terminal 100.

The information processing terminal 100, having acquired the metadata record that was transmitted from the control information processing device 500 at step S218, can use the application that was launched at step S212 to execute various processes, such as storing the acquired metadata record, providing the data to the IC chip 110, and the like (step S220).

As described above, in the second data creation method according to the first embodiment of the present invention, in the same manner as in the first data creation method, the information processing terminal 100 can acquire the first data record from the service provider information processing device 300 and transmit it to the control information processing device 500, and the control information processing device 500 can use the acquired first data record and the second data record, which was stored in advance, to create the metadata record (the service data). The first data record can be, for example, data that is expressed in the form of a markup language that makes it easy to create and modify the data. Therefore, by using the second data creation method according to the first embodiment of the present invention, the service provider can freely and easily modify the first data record in the service provider information processing device 300, in the same manner as when the first data creation method is used. This means, for example, that in the information processing system 1000, unlike in the known information processing system, program modification and the like are not required, even in a case where the first data record is modified.

Further, in a case where the service provider starts a new service, the service provider, by creating the first data record and registering in the control information processing device 500 the second data record that corresponds to the first data record, can create the service data that can be used by the information processing terminal 100, in the same manner as when the first data creation method is used. Therefore, by using the second data creation method according to the first embodiment of the present invention, the service provider is freed from the need to build a new information processing system every time the service provider provides a new service, unlike with the known information processing system.

Moreover, by creating the target metacode (the surrogate data) for specifying the metadata record (the service data) that the control information processing device 500 created, and by transmitting and receiving the target metacode (the surrogate data) to and from the control information processing device 500 and the information processing terminal 100, the second data creation method can more reliably and more safely convey to the information processing terminal 100 the service data (the metadata record) that the control information processing device 500 creates.

Third Data Creation Method

For the first and second data creation methods, a configuration was explained in which the information processing terminal 100 acquires from the service provider information processing device 300, as the first data record, data like that shown in FIG. 3B. However, the data creation method according to the embodiments of the present invention is not limited to the first and second data creation methods. Accordingly, a third data creation method will be explained next in which the control information processing device 500 creates and stores the metadata record in advance and the target metacode that corresponds to the metadata record is stored in the service provider information processing device 300. That is, in the third data creation method, the information processing terminal 100 acquires the target metacode, as the first data record, from the service provider information processing device 300.

Figure 8:
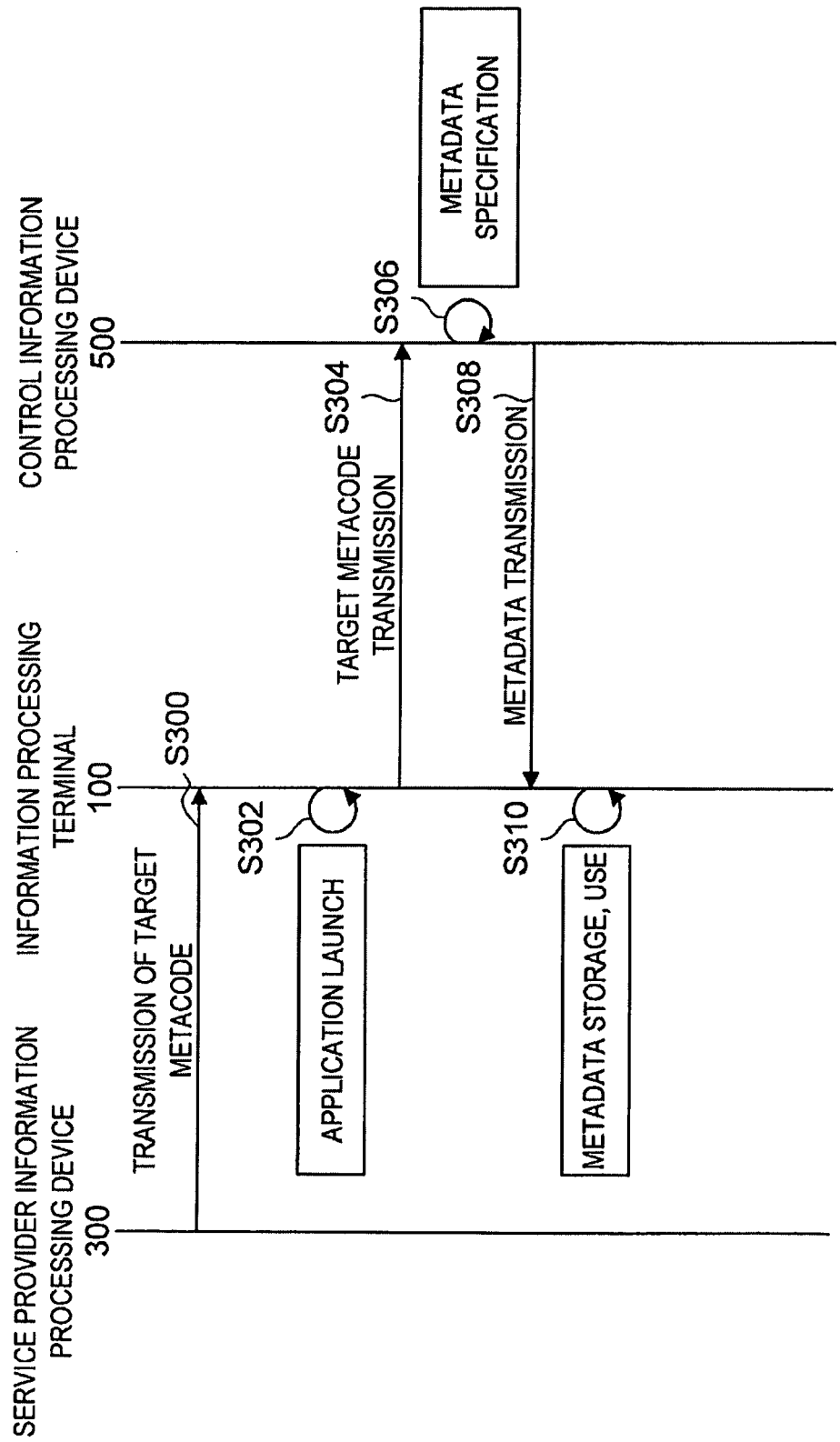
FIG. 8 is an explanatory figure for explaining a third data item creation method according to the first embodiment of the present invention.

FIG. 8 is an explanatory figure for explaining the third data item creation method according to the first embodiment of the present invention. The third data creation method will be explained below using the service provider information processing device 300 as the service provider information processing device that stores the first data record, but the service provider information processing device in the third data creation method is not limited to the service provider information processing device 300.

Furthermore, the control information processing device 500 creates in advance the metadata record that corresponds to the service that is provided by the service provider information processing device 300, as well as the target metacode that corresponds to the metadata record, although this is not shown in FIG. 8. The service provider information processing device 300 stores the target metacode that is created by the control information processing device 500, and the control information processing device 500 stores the metadata record. The control information processing device 500 can also create, for example, the data for launching the specified application in the information processing terminal 100, as shown in FIG. 7, and the target metacode that includes the address of the control information processing device 500, as indicated by the reference numeral 308 in FIG. 3B.

Note that in the case described above, if the service provider transmits to the control information processing device 500 from the service provider information processing device 300 data that is expressed in the form of a markup language that makes it easy to create and modify the data, for example, the control information processing device 500 can recreate as necessary the metadata record that it created initially. This will be explained below based on FIG. 8.

If the service provider information processing device 300 and the information processing terminal 100 are in a state in which they can communicate, the service provider information processing device 300 transmits to the information processing terminal 100 the target metacode (the first data record) (step S300). The state in which the service provider information processing device 300 and the information processing terminal 100 can communicate at step S300 may be a state in which the user of the information processing terminal 100 holds the information processing terminal 100 up to a reader/writer that is connected to the service provider information processing device 300, as shown in FIG. 1C, for example, but the state in which the service provider information processing device 300 and the information processing terminal 100 can communicate is not limited to this example.

Having acquired the target metacode that was transmitted from the service provider information processing device 300 at step S300, the information processing terminal 100, in the same manner as in the second data creation method shown in FIG. 6, launches the application that corresponds to the target metacode (step S302) and transmits the acquired target metacode to the control information processing device 500 (step S304).

The control information processing device 500, having acquired the target metacode that was transmitted from the information processing terminal 100 at step S304, specifies the metadata record that corresponds to the acquired target metacode (that is, the metadata record that was stored in advance), in the same manner as in the second data creation method shown in FIG. 6 (step S306). The control information processing device 500 then xmits to the information processing terminal 100 the data specified at step S306 (step S308).

The information processing terminal 100, having acquired the metadata record that was transmitted from the control information processing device 500 at step S308, can use the application that was launched at step S302 to execute various processes, such as storing the acquired metadata record, providing the data to the IC chip 110, and the like (step S310).

In the third data creation method according to the first embodiment of the present invention, as described above, the control information processing device 500 creates the metadata record and the target metacode in advance, and the service provider information processing device 300 transmits the target metacode (the first data record) to the information processing terminal 100. Having acquired the target metacode (the first data record), the information processing terminal 100 then transmits the target metacode (the first data record) to the control information processing device 500, whereupon the control information processing device 500 transmits the created metadata record to the information processing terminal 100. Therefore, the third data creation method can reduce the amount of communication processing below that performed in the first and second data creation methods shown in FIGS. 5 and 6.

Further, with the third data creation method, the information processing terminal 100 can acquire the specified metadata record whenever the service provider information processing device 300 and the information processing terminal 100 are in a state in which they can communicate. The convenience for the user who uses the information processing terminal 100 can therefore be improved, because the information processing terminal 100 does not require a distinct operation (for example, a button-pressing or the like by the user) like that shown in FIG. 1A, for example, in order to acquire the first data record.

Moreover, if the service provider transmits to the control information processing device 500 from the service provider information processing device 300 data that is expressed in the form of a markup language that makes it easy to create and modify the data, for example, the control information processing device 500 can recreate the metadata record and the target metacode as necessary. Therefore, when the third data creation method is used, as when the first and second data creation methods are used, the information processing system 1000, unlike the known information processing system, does not require program modification and the like, even in a case where the first data record is modified.

In the information processing system 1000, as described above, the information processing terminal 100 acquires the first data records from the service provider information processing devices 300, 400 and the like and transmits the first data records to the control information processing device 500. Using the acquired first data records and the second data records, which are stored in advance, the control information processing device 500 can create the metadata records (the service data) that can be used by the information processing terminal 100. The first data records can be, for example, data that are expressed in the form of a markup language that makes it easy to create and modify the data. Therefore, the service provider can freely and easily modify the first data records in the service provider information processing devices 300, 400 and the like. This means, for example, that in the information processing system 1000, unlike in the known information processing system, program modification and the like are not required, even in a case where the first data records are modified.

Further, in a case where the service provider starts a new service, the service provider, by creating the first data record and registering in the control information processing device 500 the second data record that corresponds to the first data record, can create the service data that can be used by the information processing terminal 100. The service provider who uses the information processing system 1000 is therefore freed from the need to build a new information processing system every time the service provider provides a new service, unlike with the known information processing system.

Moreover, the service data that is created by the control information processing device 500 according to the first embodiment of the present invention can serve as the metadata record that is expressed in the form of a markup language. Because the control information processing device 500 creates the metadata record as the service data, the method of describing the data and the method of accessing the individual data elements can be standardized. The first embodiment of the present invention can therefore exhibit the effects described below, for example.

In a case where the information processing terminal 100 is used in a mobile telephone, for example, the standardization of the method of describing the data and the method of accessing the individual data elements makes it possible to reduce the user's dependence on a company that provides a communication service for a specific mobile telephone, on a specific model of mobile telephone, and the like.

Furthermore, in a case where the information processing terminal 100 is used in a mobile telephone, for example, even if the user replaces a Subscriber Identity Module (SIM) chip that is provided in the mobile telephone, the standardization of the method of describing the data and the method of accessing the individual data elements makes it possible to use the service data in the same manner before and after the chip is replaced.

The information processing terminal 100 has been explained as a configuring element of the information processing system 1000 according to the first embodiment of the present invention, as shown in FIG. 2, but the first embodiment of the present invention is not limited to this configuration. For example, the information processing terminal 100 can also be used in a mobile communication device such as a mobile telephone or a Personal Handyphone System (PHS) that is equipped with a smart card and an IC chip, as well as in a computer or the like, such as a ultra mobile personal computer (UMPC) or the like that is provided with an IC chip. The service provider information processing device 300 and the control information processing device 500 have also been explained as configuring elements of the information processing system 1000, but the first embodiment of the present invention is not limited to this configuration. For example, the service provider information processing device 300 and the control information processing device 500 can also be used in a computer such as a personal computer, a server, or the like.

Program for the Control Information Processing Device 500 According to the First Embodiment A program that causes a computer to function as the control information processing device 500 according to the first embodiment can create data that can be used by the information processing terminal 100, based on the first data record that is transmitted from the information processing terminal 100, which is equipped with the IC chip 110, and on the second data record that is stored in the control information processing device 500.

Second Embodiment

A configuration of the information processing system 1000 according to the first embodiment was explained above in which the control information processing device 500 newly creates the service data that is used by the information processing terminal 100. However, the information processing system according to the embodiments of the present invention is not limited to a configuration in which a control information processing device newly creates the service data. Accordingly, an information processing system according to a second embodiment will be explained in which an information processing terminal (a data provider device) stores service data and conveys the service data to another information processing terminal.

FIG. 9 is a block diagram that shows an information processing system 2000 according to the second embodiment of the present invention. Referring to FIG. 9, the information processing system 2000 has an information processing terminal 100, an information processing terminal 200, and a control information processing device 500. The control information processing device 500 is connected to the information processing terminals 100, 200 by separate network circuits. The network circuits may be wired networks such as WANs or the like, or wireless networks such as WLANs or the like. The network circuits may also be the Internet and utilize a communications protocol such as TCP/IP or the like, but the network circuits are not limited to these examples.

The information processing terminal 100 and the information processing terminal 200 can communication with one another. The communication between the information processing terminal 100 and the information processing terminal 200 can be wireless communication that utilizes infrared light, IEEE 802.11, IEEE 802.15.1, or the like, for example. In other words, the information processing terminal 100 and the information processing terminal 200 can perform one-to-one communication. Note that FIG. 9 shows that wireless communication is performed between the information processing terminal 100 and the information processing terminal 200, but it is obvious that the communication between the information processing terminal 100 and the information processing terminal 200 can be wire communication.

The information processing terminal 100 and the information processing terminal 200 can each be configured in the same manner as the information processing terminal 100 according to the first embodiment of the present invention, shown in FIG. 2, and the control information processing device 500 can be configured in the same manner as the control information processing device 500 according to the first embodiment of the present invention, also shown in FIG. 2. Accordingly, a data transfer method that conveys the service data from the information processing terminal 100 to the information processing terminal 200 will be explained below.

Data Transfer Method

FIG. 10 is an explanatory figure for explaining the data transfer method according to the second embodiment of the present invention. FIG. 10 shows a case where the service data is conveyed from the information processing terminal 100 to the information processing terminal 200. The conveying of the service data from the information processing terminal 100 to the information processing terminal 200 may be either a copying of the service data or a moving of the service data from the information processing terminal 100 to the information processing terminal 200.

First, communication is performed between the information processing terminal 100 and the control information processing device 500, and the processing to transmit and receive the service data is started (step S400).

When the processing to transmit and receive the data is started, the information processing terminal 100 transmits to the control information processing device 500 the service data that will be moved to the information processing terminal 200 (step S402).

The control information processing device 500, having acquired the service data from the information processing terminal 100, creates the target metacode and the metadata record based on the acquired service data (step S404). In a case where the service data that is transmitted at step S402 is the metadata record, the creation of the metadata record may be omitted. The method of creating the metadata record based on the acquired service data can, for example, involve analyzing the service data and converting it in to the metadata record by expressing it in the form of a markup language that is set in advance. The method of creating the target metacode based on the acquired service data may involve computing a hash value based on the service data, for example. Note that the methods of creating the target metacode and the metadata record based on the acquired service data are obviously not limited to these examples.

The control information processing device 500 transmits to the information processing terminal 100 the target metacode that was created at step S404 (step S406).

Having acquired the target metacode from the control information processing device 500, the information processing terminal 100 transmits the acquired target metacode to the information processing terminal 200 as the first data record (step S408). Note that in the information processing terminal 100 that has acquired the target metacode, an application that corresponds to the target metacode may be launched, and the application may perform the processing at step S408, although this is not shown in FIG. 10.

The information processing terminal 200, having acquired the target metacode from the information processing terminal 100, transmits the acquired target metacode to the control information processing device 500 (step S410). Note that in the information processing terminal 200 that has acquired the target metacode, an application that corresponds to the target metacode may be launched, and the application may perform the processing at step S410, although this is not shown in FIG. 10.

Having acquired the target metacode from the information processing terminal 200, the control information processing device 500 specifies the metadata record that corresponds to the acquired target metacode (step S412) and transmits the specified metadata record to the information processing terminal 200 (step S414). The specifying of the metadata record at step S412 can be done, for example, by comparing a hash value to the acquired target metacode and to the target metacode that was created at step S404, then selecting the metadata record that corresponds to the target metacode that matches the hash value. However, the specifying of the metadata record at step S412 is not limited to this example. Step S412 may be performed by the data creation portion 506, and it can also be performed by a control portion (not shown in the drawings) that is provided in the control information processing device 500.

The information processing terminal 200, having acquired the metadata record that was transmitted from the control information processing device 500 at step S414 (that is, the data record that corresponds to the service data that was transmitted from the information processing terminal 100), can store the acquired metadata record and use it as necessary (step S416). The transfer of the service data between the information processing terminal 100 and the information processing terminal 200 is accomplished by the various kinds of processing at steps S400 to S416 described above.

In the information processing system 2000 according to the second embodiment of the present invention, as described above, the service data can be transferred between the information processing terminal 100 and the information processing terminal 200 through the control information processing device 500. The control information processing device 500 can also maintain a log as a processing history of the various kinds of processing, such as the communication processing, the target metacode creation processing, and the like. Accordingly, because the transfer of the service data between the information processing terminal 100 and the information processing terminal 200 is carried out through the control information processing device 500, it is possible to use the control information processing device 500 to check which information processing terminal transferred the service data to which information processing terminal at what time. Traceability can therefore be achieved for the transfer of the service data in the information processing system 2000.

Further, because the service data transmitting and receiving processing between the information processing terminal 100 and the information processing terminal 200 in the information processing system 2000 is carried out using one-to-one communication by infrared light or the like, for example, the service data that is digital data, for example, can be transferred in the same manner as it would be in a physical medium such as paper or the like. In other words, the information processing system 2000 can achieve flexible distribution of the service data.

It should be understood by those skilled in the art that various modifications, combinations, sub-combinations and alterations may occur depending on design requirements and other factors insofar as they are within the scope of the appended claims or the equivalents thereof.

For example, in the second data creation method according to the first embodiment, shown in FIG. 6, it is possible for the data involved in the communication between the configuring elements to be encrypted. For instance, the control information processing device 500 can create the target metacode in encrypted form, and the information processing terminal 100 can decrypt and use the target metacode, and the like.

The configurations described above are illustrative examples of the embodiments of the present invention and are naturally within the technological scope of the present invention.

What is claimed is:

1. An information processing system comprising:
    an information processing terminal that is equipped with an IC chip that establishes non-contact communication with a reader/writer;
    a data provider device that stores a first data record that is used to create service data that include data used by the IC chip; and
    a control information processing device that creates the service data and transmits the service data to the information processing terminal;
    wherein:
        the information processing terminal includes a terminal communication portion that acquires the first data record from the data provider device and transmits the first data record to the control information processing device;
        the control information processing device includes:
            a control communication portion that receives the first data record that is transmitted from the information processing terminal,
            a control storage portion that stores at least one second data record that is used to create the service data, and
            a data creation portion that creates the service data by embedding information from the first data record in the at least one second data record that corresponds to the first data record; and
        the information processing terminal launches a specified application upon receiving the service data.

2. A control information processing device that creates service data that include data used by an IC chip that establishes non-contact communication with a reader/writer, and that transmits the service data to an information processing terminal that is equipped with the IC chip, the control information processing device comprising:
    a control communication portion that receives a first data record that is transmitted from the information processing terminal and that is used to create the service data;
    a control storage portion that stores at least one second data record that is used to create the service data; and
    a data creation portion that creates the service data by embedding information from the first data record in the at least one second data record that corresponds to the first data record;
    wherein the service data is used to launch a specified application.

3. The control information processing device according to claim 2, wherein:
    the first data record that is transmitted from the information processing terminal is dynamic data that is stored in a data provider device that is a device that is external to the information processing terminal, the dynamic data being modifiable in the data provider device; and
    the second data record is static data that is stored in advance in the control storage portion.

4. The control information processing device according to claim 3, wherein:
    the first data record is expressed in the form of a markup language; and
    the data creation portion interprets the first data record that is expressed in the form of a markup language and selects from the at least one second data record that is stored in the control storage portion at least one second data record that corresponds to the first data record.

5. The control information processing device according to claim 2,
    wherein the service data that the data creation portion creates is a metadata record that is expressed in the form of a markup language.

6. The control information processing device according to claim 2,
    wherein in a case where the data creation portion has also created and transmitted to the information processing terminal surrogate data that is used to specify the created service data, and has acquired the surrogate data from the information processing terminal, the data creation portion transmits to the information processing terminal the service data that corresponds to the surrogate data.

7. A non-transitory computer readable medium encoded with a computer program for a control information processing device that stores at least one second data record that is used to create service data that include data used by an IC chip that establishes non-contact communication with a reader/writer, the program comprising instructions that command a computer to function as:
    a portion that receives a first data record that is transmitted from an information processing terminal equipped with the IC chip and that is used to create the service data; and
    a portion that creates the service data by embedding information from the first data record in the at least one second data record that corresponds to the first data record;
    wherein the service data is used to launch a specified application.

* * * * *